(No Model.)
J. R. HICKS.
ROTARY HARROW.
No. 325,932. Patented Sept. 8, 1885.
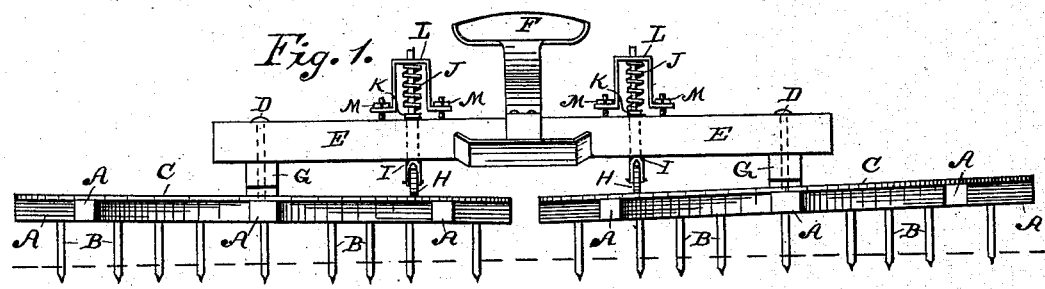
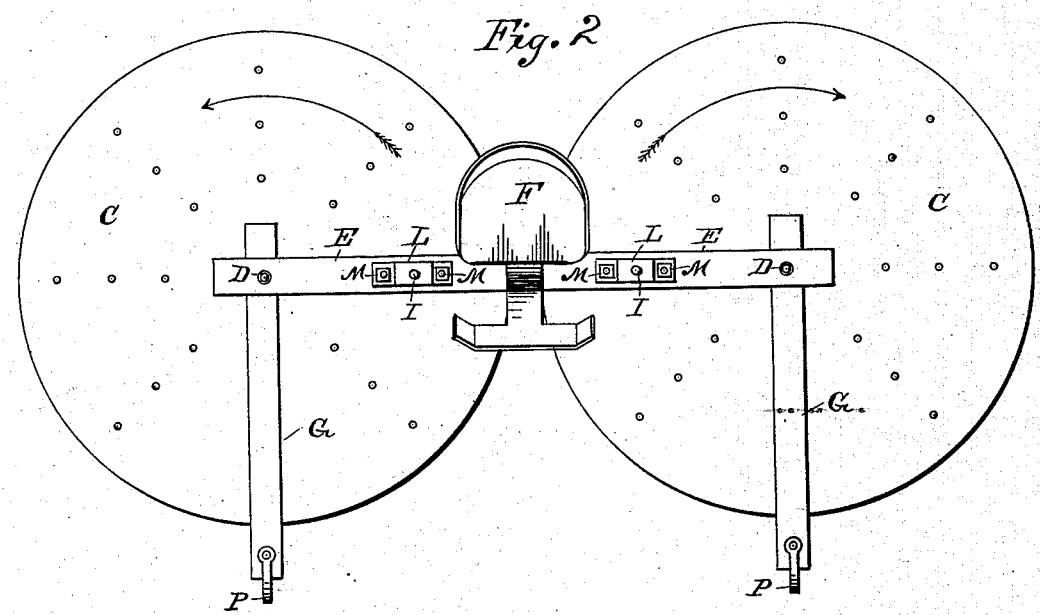
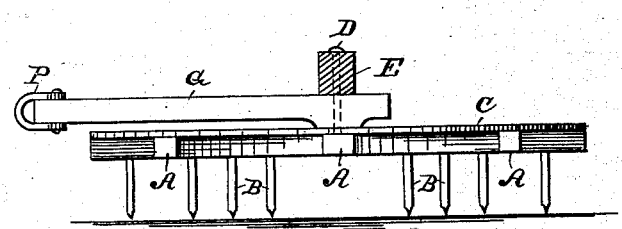
WITNESSES:
Harrison B Brown
W.R. Stevens.
INVENTOR:
James R. Hicks
BY Munn & Co
ATTORNEYS.

UNITED STATES PATENT OFFICE.

JAMES R. HICKS, OF KANSAS CITY, MISSOURI.

ROTARY HARROW.

SPECIFICATION forming part of Letters Patent No. 325,932, dated September 8, 1885.

Application filed September 15, 1884. (No model.)

*To all whom it may concern:*

Be it known that I, JAMES R. HICKS, a citizen of the United States, residing at Kansas City, in the county of Jackson and State of Missouri, have invented certain new and useful Improvements in Rotary Harrows, of which the following is a description.

This invention relates to that class of harrows which are journaled to revolve about vertical axes; and it has for its object to keep corn or cotton stalks down among the harrow-teeth, to break the stalks and to prevent their running up through the harrow to entangle it and to endanger the rider. Its object is, further, to so hang a pair of rotary harrows that either harrow may remain fixed on the ground while the other revolves around it in turning corners, and to insure the revolving of the harrow when advancing on the field.

To this end my invention consists in the construction and combination of parts forming a harrow hereinafter described and claimed, reference being had to the accompanying drawings, in which—

Figure 1 is a front elevation of my harrow. Fig. 2 is a plan view of the same; and Fig. 3 is a side elevation of one harrow, showing the cross-beam in section.

A represents the frames of two harrows, which may be of any usual form; but I prefer to give them a radial form from the center of each, and to fix the teeth B to project downward therefrom. These arms of each frame are surmounted with a disk, C, which is secured firmly to all the arms, thereby becoming a part of each frame, tending to make it very strong. Both of these harrows are pivoted to revolve on bolts D, which pass up through a cross-beam, E, on which the rider's seat F is fixed.

G G are draft-bars pivoted upon the bolts D between the harrows and cross-bar, and extending their clevises P sufficiently beyond the circumference of each disk to keep the team attachments free of the harrows whether the team is pulling straight ahead or turning a corner. In the latter case one harrow may remain fixed in the ground while the other turns around it, the draft-bars swinging around their pivotal attachments sufficiently to remain in line with the draft of the team and to draw straight from the center of each harrow in any direction.

H H represent rollers journaled in forked rods I, which slide vertically through the cross-beam E and are pressed downward by springs J, acting between a collar, K, on each rod and a vertically-adjustable yoke, L. This yoke is attached to the cross-beam by means of adjusting screw-bolts M, whereby more or less tension may be exerted on the springs and through them on the rollers. The rollers tend to depress the two harrows at their adjacent sides, which depressing causes the teeth at those sides to bury deeper in the ground than the teeth at the other sides do, thereby retarding the depressed sides and causing the two harrows to rotate by the act of advancing the machine. The disks serve as hoods to keep corn and cotton stalks down among the harrow-teeth, where the stalks will be broken up, and in so doing they prevent the stalks from entangling the harrows and from pushing up through the harrows and endangering the driver.

What I claim as my invention, and desire to secure by Letters Patent, is—

The combination of the cross-beam E, two harrows vertically journaled thereto, a circular hood covering the top of each harrow, forked rods I, fitted to slide vertically through the beam E, rollers H, journaled in the forked rods above and in contact with the said hoods to roll thereon, the yokes L above the beam E, the springs J, acting between the yokes and shoulders upon the rods I to press the rollers H upon the hoods, and adjusting screw-bolts M, securing the yokes to the cross-beam, substantially as shown and described.

JAMES R. HICKS.

Witnesses.
WILLIAM VINEYARD,
C. R. ROBERTSON.